United States Patent [19]
DeLong

[11] Patent Number: 5,264,117
[45] Date of Patent: Nov. 23, 1993

[54] DISTILLATION OF HYDROCARBONS
[75] Inventor: Gail M. DeLong, Philadelphia, Pa.
[73] Assignee: Sun Refining and Marketing Company, Philadelphia, Pa.
[21] Appl. No.: 691,163
[22] Filed: Apr. 24, 1991

Related U.S. Application Data
[63] Continuation-in-part of Ser. No. 432,265, Nov. 6, 1989, abandoned.
[51] Int. Cl.⁵ .......................... B01D 3/00; B01D 3/34; C10G 7/00
[52] U.S. Cl. ...................... 208/354; 203/75; 203/76; 203/78; 203/79; 203/82; 203/83; 203/84; 203/85; 203/99; 203/DIG. 9; 203/DIG. 19; 203/49; 208/356; 208/363
[58] Field of Search ............... 203/83, 99, 49, DIG. 9, 203/DIG. 19, 75, 78, 76, 79, 82, 84, 85; 202/154, 155; 208/354, 356, 347, 363, 362

[56] References Cited
U.S. PATENT DOCUMENTS

| | | | |
|---|---|---|---|
| 2,126,420 | 8/1938 | Stratford | 208/354 |
| 2,160,256 | 5/1939 | Aldridge et al. | 208/354 |
| 3,096,274 | 7/1963 | Palmer, Jr. | 208/355 |
| 3,326,781 | 6/1967 | Wilson, Jr. | 203/83 |
| 3,462,347 | 8/1969 | Chapman et al. | 203/83 |
| 3,798,132 | 3/1974 | Sarno | 203/99 |
| 3,926,785 | 12/1975 | Siegel | 208/354 |

FOREIGN PATENT DOCUMENTS 0048400 8/1964 Poland ................................ 203/83

OTHER PUBLICATIONS
Perry's Chemical Engineers Handbook, Sixth ed. McGraw Hill Book Co., 1984, pp. 13-75; 13-77 & 13-80.

Primary Examiner—Virginia Manoharan
Attorney, Agent, or Firm—Q. Todd Dickinson; Stephen T. Falk

[57] ABSTRACT

Where side stream distillate strippers are used in the distillation of hydrocarbons, the required size of the distillation column and the amount of stripping gas or vapor required are reduced by passing components stripped from the distillates through a plurality of strippers in series, rather than directly back to the distillation zone.

4 Claims, 1 Drawing Sheet

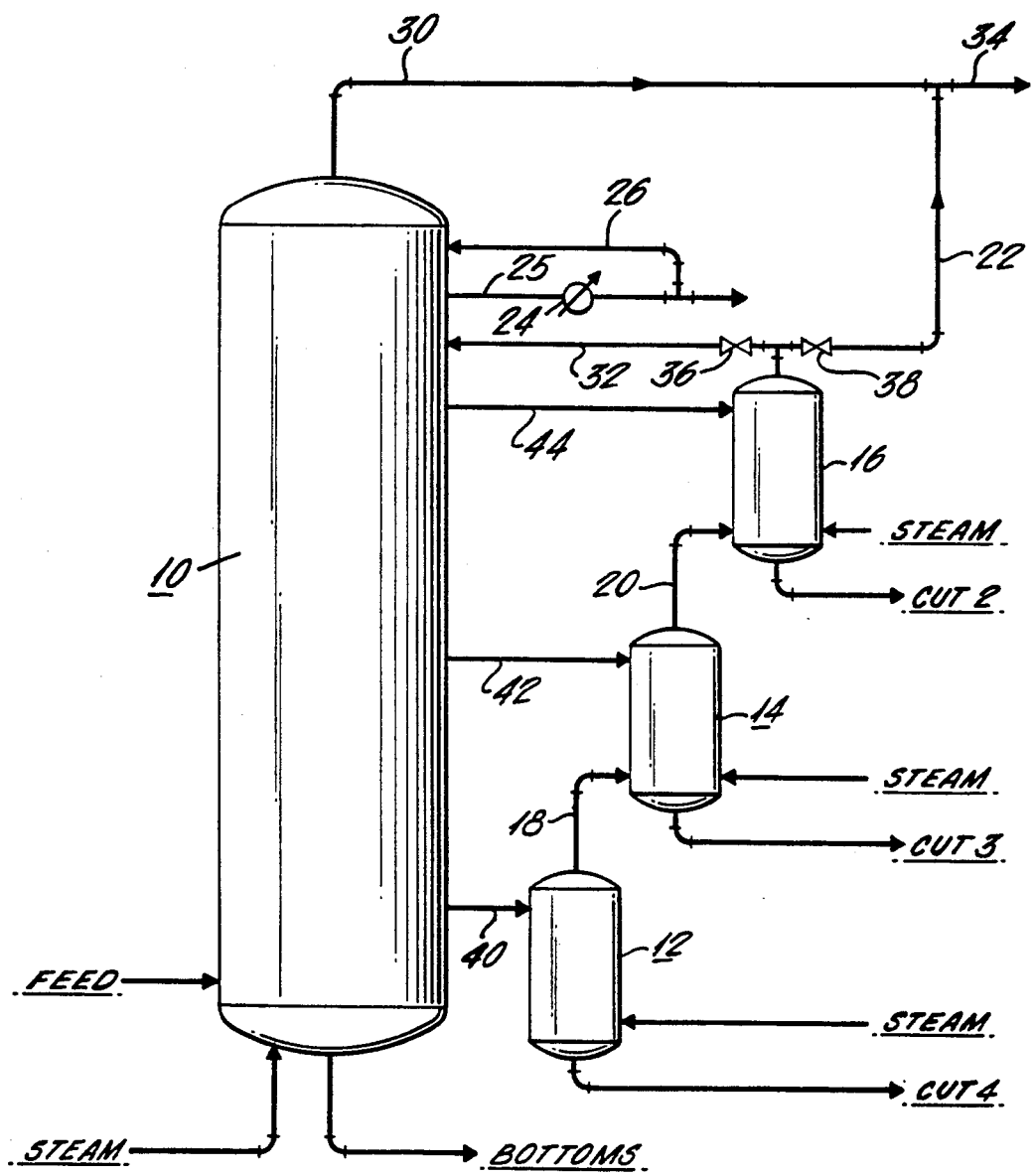

DISTILLATION OF HYDROCARBONS

This application is a continuation-in-part of application Ser. No. 07/432,265, filed Nov. 6, 1989, abandoned.

BACKGROUND OF THE INVENTION

This invention relates to distillation of organic compounds, and to an improved method and apparatus for sidestream stripping of a distillate fraction or fractions therefrom.

In the distillation of organic compounds, wherein a plurality of distillates of different boiling ranges are removed from the distillation column, and particularly where the distillates are mixtures of compounds varying in volatility, it is common to subject the distillates, after removal in liquid phase from the distillation column, to contact with a stripping gas or vapor such as steam in order to remove more volatile components from the distillate, thus narrowing the boiling range of the distillate for various reasons depending on the circumstances. The stripping gas or vapor containing the vaporized, more volatile components is then typically returned to the distillation column.

In one embodiment, the stripping of distillates is used in the distillation of petroleum hydrocarbons, for example in the atmospheric pressure or vacuum distillation of crude petroleum. As shown in Perry's Chemical Engineers' handbook, Sixth Edition, McGraw-Hill Book Company, 1984, in FIG. 13-76 on page 13-75, steam is introduced into each of a plurality of sidestream strippers, and steam containing organic components stripped from the sidestream, is removed from each of the strippers and introduced into the main tower. See also FIG. 13-79 on page 13-77 and FIG. 13-80 on page 13-80, Perry, op.cit.

The side stream strippers are used in distillation design when narrow boiling distillation cuts are desired. The stripping gas or vapor injected into the strippers leaves in the stripper overhead line and is routed to the main tower. The gas or vapor serves a stripping purpose in the strippers but adds to the vapor load in the main tower. The main tower must be designed wider due to this gas or vapor volume. The invention provides the advantage of reducing the vapor load in the main tower. The main tower can thus be designed narrower, resulting in lower capital requirements, or an existing distillation unit can be debottlenecked for greater throughput without reducing the distillation efficiency. Other advantages of the invention are lower operating costs because of reduced total volume of stripping gas or vapor required, and the ability to obtain improved stripping through greater pressure differentials than in conventional operation.

SUMMARY OF THE INVENTION

The present invention is a distillation process in which (1) organic compounds are introduced as feed to a distillation zone, wherein they are separated into two or more liquid fractions, one of which fractions (2) is contacted with stripping gas or vapor in a first stripping zone to vaporize components thereof, to obtain a first overhead fraction containing stripping gas or vapor and the vaporized components and a first residual fraction containing liquid hydrocarbon distillate, and a second of which fractions (3) is contacted with stripping gas or vapor in a second stripping zone to vaporize components thereof to obtain a second overhead fraction containing stripping gas or vapor and the last-named vaporized components and a second residual fraction containing liquid hydrocarbon distillate, and (4) the first overhead fraction is passed from the first stripping zone into the second stripping zone wherein components of said first overhead fraction are condensed and removed from the second stripping zone in the second residual fraction.

BRIEF DESCRIPTION OF THE DRAWING

The invention will further be described in connection with the drawing, which shows a main tower and three side stream towers according to one embodiment of the invention.

DETAILED DESCRIPTION OF THE DRAWING

Referring to the drawing, a feed stream is introduced as shown into main tower 10 and is subjected to distillation in conventional fashion therein. Steam, as an example of stripping gas or vapor, is introduced into tower 10 as shown, to assist in the distillation in conventional fashion. Distillates are removed from the tower in conventional manner and introduced into side stream strippers 12, 14 and 16 via lines 40, 42 and 44, respectively. Steam is introduced into stripper 12 and passes upwardly therethrough, stripping lower boiling components from the side stream passing downwardly therethrough. The distillate, from which lower boiling components have been removed, is withdrawn from stripper 12 as cut 4, as shown.

Steam containing components stripped from the side stream, is passed through line 18 into stripper 14, and passes upwardly therethrough. Preferably, all or substantially all of the overhead fraction from stripping zone 12 is passed through line 18 into stripping zone 14, and none, or substantially none, of that overhead fraction is returned to main tower 10. Additional steam is introduced into stripper 14 as shown and passes upwardly therethrough, stripping lower boiling components from the side stream passing downwardly therethrough. The distillate from which lower boiling components have been removed, is withdrawn from stripper 14 as cut 3, as shown. Lower-boiling components stripped from the side stream in stripper 12, are partly condensed in stripper 14 and removed therefrom in cut 3. The remainder of such lower-boiling components, together with steam, and lower-boiling components stripped from the side stream in stripper 14, is passed through line 20 into side stream stripper 16, and passes upwardly therethrough. Preferably, all or substantially all of the overhead fraction from stripping zone 14 is passed through line 20 into stripping zone 16, and none, or substantially none, of that overhead fraction is returned to main tower 10. Additional steam is introduced into stripper 16 as shown and passes upwardly therethrough, stripping lower boiling components from the side stream passing downwardly therethrough. The distillate from which lower boiling components have been removed, is withdrawn from stripper 14 as cut 2, as shown. Lower-boiling components stripped from the side stream in stripper 14, are partly condensed in stripper 16 and removed therefrom in cut 2. The remainder of such lower-boiling components, together with steam and lower-boiling components stripped from the side stream in stripper 16, is withdrawn from stripper 16 through line 22.

The steam and hydrocarbon vapors removed from stripper 16 through line 22 may be combined with vapors removed from tower 10 as overhead through line 30 with or without prior condensation, and removed through line 34 or may be treated in a separate condensation and product recovery system not shown, or routed back to an upper section of the main tower through line 32. Valves 36 and 38 enable the overhead from zone 16 to be passed through lines 22 or 32 as desired. Treatment of effluent 22 in a separate condensation and recovery system has the advantage that the pressure in such system and in the stripping zones 12, 14 and 16, can be lower than the pressure in the main tower 10, and therefore provide improved stripping as a result of greater pressure differentials over the stripping zones.

As used in the description of this invention, the phrase "lower side stream" refers to the higher boiling-temperature fraction off the distillation column 10 which is carried away from column 10 through line 42 to stripper 14. The "upper side stream" refers to the lower boiling-temperature fraction coming off column 10 through line 44 to stripper 16.

The stripping gas or vapor flow rate may be any rate that does not lead to flooding in the strippers. The pressure in the strippers should be lower than the pressure at the associated main tower draw stream location unless pumps or head pressure are used on the main tower streams to enable flow. A three stripper unit is shown here for illustration purposes. The unit could have more than three strippers and as few as two strippers. In a multi-stripper distillation unit, one or more of the strippers can follow the invention configuration, and remaining strippers follow the prior art configuration.

In the process of the invention, the components stripped from the distillates in the side stream strippers become components of a liquid residual fraction in a higher stripper, or if not condensed in the highest stripper, become components of the overhead from that stripper.

A distillate is removed from the tower 10 through line 25 and condensed by cooling in condenser 24. The condensed distillate is removed through line 27, or returned as reflux through line 26. Such removal of distillate which is not thereafter subjected to stripping, is optional according to the invention.

Although, in the invention as described in the drawing, additional stripping gas or vapor is introduced into each of the strippers, such additional stripping gas or vapor may not be introduced into the upper stripper or strippers, and stripping gas or vapor introduced into a lower stripper may provide the stripping gas or vapor for two or more strippers.

The invention claimed is:

1. A distillation process which comprises introducing petroleum hydrocarbons as feed to a distillation zone, separating said hydrocarbons into two or more liquid hydrocarbon fractions, contacting one of said fractions with stripping gas or vapor in a first stripping zone to vaporize components thereof, to obtain a first overhead fraction containing stripping gas or vapor and said vaporized components and a first stripping zone bottoms product, contacting a second of said fractions with stripping gas or vapor in a second stripping zone to vaporize components thereof to obtain a second overhead fraction containing stripping gas or vapor and vaporized components of said second fraction and a second stripping zone bottoms product, and passing all or substantially all of said first overhead fraction from said first stripping zone directly into said second stripping zone wherein components of said first overhead fraction are condensed and removed from said second stripping zone in said second stripping zone bottoms product, such that there is a reduced vapor load in said distillation zone, a reduced total volume of stripping gas or vapor, and improved stripping.

2. The process as claimed in claim 1, wherein none of said first or second overhead fractions is returned to the distillation zone.

3. A distillation process which comprises introducing hydrocarbons as feed to a distillation zone, separating said hydrocarbons into at least two side streams comprising a lower side stream, an upper side stream, and a distillation zone overhead fraction, introducing a stripping gas into said lower side stream in a stripping zone, removing a stripping zone overhead fraction containing stripping gas from said stripping zone, passing said stripping zone overhead fraction directly to a stripping zone for said upper side stream, and returning the stripper overhead fraction from stripping said upper side stream to the distillation zone, such that there is a reduced vapor load in said distillation zone, a reduced total volume of stripping gas or vapor, and/or improved stripping.

4. A distillation process which comprises introducing hydrocarbons as feed to a distillation zone, separating said hydrocarbons into at least two side streams comprising a lower side stream, an upper side stream, and a distillation zone overhead fraction, introducing a stripping gas into said lower side stream in a stripping zone, removing a stripping zone overhead fraction containing stripping gas from said stripping zone, passing said stripping zone overhead fraction directly to a stripping zone for said upper side stream, and combining the stripper overhead fraction from stripping said upper side streams with said distillation zone overhead fraction, such that there is a reduced vapor load in said distillation zone, a reduced total volume of stripping gas or vapor, and/or improved stripping.

* * * * *